United States Patent Office 2,981,643
Patented Apr. 25, 1961

2,981,643

PROCESS FOR DESCALING AND DECONTAMINATING METALS

Russell D. Baybarz, Knoxville, Tenn., assignor to the United States of America as represented by the United States Atomic Energy Commission No Drawing. Filed Feb. 19, 1958, Ser. No. 716,248

6 Claims. (Cl. 134—3)

My invention relates to a method of cleaning metal surfaces and more particularly to the removal of surface oxide scale from stainless steels.

In certain applications stainless steels and similar metals become coated with an oxide scale which must be removed in order to clean the surface of the metal. Surface oxide removal is particularly important in the decontamination of an aqueous homogeneous nuclear reactor of the type described in co-pending application Serial No. 321,078, by Charles E. Winters et al., filed November 18, 1952, and assigned to the United States Government, now Patent No. 2,945,794, which issued on July 19, 1960. In the operation of this type reactor an aqueous fuel solution, such as a solution of uranyl sulfate, is circulated through the reactor system. As a result of nuclear fission and neutron irradiation, fission products and plutonium are produced in the solution. Upon extended operation of the reactor, an oxide scale comprised chiefly of corrosion products, fission products and plutonium is deposited on the metal surfaces of the reactor system, even if the metals involved are of the corrosion-resistant class such as stainless steels and zirconium alloys.

Various types of oxide-removing agents, including mineral acids and complexing agents, have been employed in the past, but each of these types presents disadvantages. Mineral acids used in concentrations strong enough to remove and dissolve the oxide scale are destructive to the metal. Complexing agents, such as oxalates, tartrates, carbonates, peroxides and the corresponding acids, are effective in removing the scale, but the scale is removed in large flakes. In the use of these complexing agents the solution either dissolves the outer surface of the metal or the inner oxide surface, leaving the outer, more resistant oxide flakes undissolved. These undissolved oxide flakes cause difficulty by clogging and by settling in inaccessible portions of the apparatus being cleaned. Another disadvantage of using the prior oxide-removing agents to decontaminate such a nuclear reactor is that many of these agents introduce undesirable ions into the reactor system.

It is, therefore, one object of my invention to provide a method of removing oxide scale from corrosion-resistant metals.

Another object is to provide a method of removing oxide scale from stainless steels and zirconium-base alloys.

Another object is to provide a method of removing oxide scale from stainless steels in which the oxide scale is dissolved or disintegrated into a slurry.

Another object is to provide a method of removing oxide scale from stainless steels in which the chemical attack upon the metal is minimized.

Another object is to provide a method of removing radioactive contaminants from the surface of stainless steels.

In accordance with my invention oxide scale may be removed from the surface of corrosion-resistant metal by contacting the metal with a relatively dilute aqueous sulfuric acid solution containing divalent ionic chromium while maintaining said chromium in its divalent state. I have found that the strong reducing action of divalent ionic chromium modifies adhering oxides to such an extent that the oxides are dissolved or disintegrated by the sulfuric acid solution. Oxide scale may be readily removed by this method without appreciable corrosion damage to the metal. No undesirable ions are introduced into an aqueous homogeneous nuclear reactor of the type referred to above, since the chromium for my invention is supplied in the form of chromous sulfate. Sulfate ions are not harmful since uranyl sulfate is a preferred fuel for this type reactor, and small amounts of ionic chromium are already present in the reactor system as a result of chemical attack upon the stainless steel metal in the system.

The divalent ionic chromium in the solution is supplied in the form of chromous sulfate. Chromous sulfate may be conveniently prepared from chromic salts, exemplified by $KCr(SO_4)_2 \cdot 12H_2O$ and $Cr_2(SO_4)_3 \cdot 15H_2O$, by means of conventional zinc reduction or electrolytic reduction. Because of the strong tendency of the chromous ions to oxidize, the solution must be prepared and employed in the absence of air, preferably by means of providing an atmosphere of a gas inert to chromous ions, such as helium, nitrogen, or carbon dioxide. Where a closed circulating system is being cleaned, the ionic chromium may be conveniently maintained in the divalent state by continuously circulating the solution through an electrolytic cell.

A wide range of temperatures and reagent concentrations may be employed within the scope of my invention. Reagent concentrations in this specification and the appended claims are expressed in terms of the molarity (M) of the solutions involved. Chromous sulfate concentrations from 0.1 M to 1.5 M are effective in removing oxide scale. However, removal is slow at concentrations below 0.2 M, and for optimum results I prefer to use an intermediate concentration of 0.3 M to 0.5 M.

Sulfuric acid concentrations from 0.1 M to 1.5 M may be employed. A concentration of approximately at least 0.2 M is required to completely dissolve the scale, even at elevated temperatures, and at concentrations of 1.0 M and above corrosion of the metal becomes relatively rapid. I prefer to use an intermediate concentration of 0.4 M to 0.6 M by means of which satisfactory oxide removal is obtained without appreciable corrosion to the metal.

Although temperature is not critical to my invention, the time required for oxide removal varies with the temperature employed. Temperatures from room temperature to approximately 90° C. may be used. At a temperature of approximately 20° C., 12 to 24 hours' contact time is required to remove the scale, and the scale is not dissolved in the weaker acid solutions but is disintegrated into a finely divided slurry. Removal of the oxide in slurry form at room temperature has the advantage, with respect to decontaminating a nuclear reactor, that the radioactive contaminants are not dissolved and do not become adsorbed on the cleaned metal surface. At relatively high temperatures, that is, from 70° C. to 90° C., the oxide scale dissolves completely in two hours. At temperatures above 90° C. the water in the chromous sulfate-sulfuric acid solution tends to decompose to gaseous hydrogen and oxygen.

At the higher dissolution temperatures, e.g., 70–90° C., the dissolved radioactive contaminants tend to be adsorbed on the metal surface. These adsorbed contaminants may, however, be removed by washing the metal with a conventional decontaminating solution, such a solution containing 10% sodium hydroxide, 2.5% sodium tartrate and 2.5% hydrogen peroxide. Accordingly, for rapid removal of an oxide scale containing radioactive contaminants I prefer to employ a temperature from 70° C. to 90° C. and to remove adsorbed radioactive substances from the descaled metal surface by washing with an alkaline-tartrate-peroxide solution.

Although my invention is primarily applicable to the metals employed in homogeneous nuclear reactors, such as stainless steels of various types and the zirconium-base alloys containing minor proportions of tin, iron and chromium which have been employed for reactor construction, it is not to be understood as so limited. Other metals and alloys resistant to corrosion by the chromous sulfate-sulfuric acid solution may also be cleaned by the method of my invention. Any metal which is corroded by a 0.65 M sulfuric acid solution at a rate less than approximately 350 mils per year may be cleaned by the process of my invention without appreciable damage to the metal.

My invention will be further illustrated by the following specific examples.

EXAMPLE I

A stainless steel autoclave liner, upon which was deposited plutonium and fission products from a uranyl sulfate solution at 250° C. to 300° C. and which had an oxide coating of 8 to 10 mils thickness was used to compare the effectiveness of room temperature treatment with 85° C. treatment. The liner was cut into pieces and immersed in a solution containing 0.4 M chromous sulfate and 0.8 M sulfuric acid under an atmosphere of carbon dioxide. Three pieces were heated to 85° C. and three were maintained at room temperature of 23° C. After two hours' time at 85° C. the oxide film was completely dissolved and the metal samples were removed and rinsed with water. The samples treated at 23° C. required 12 hours for complete removal of the oxide, after which they were also removed and rinsed with water. Overall beta-gamma radiation decontamination and plutonium removal for these samples are shown in Table I.

*Table I*

| Temperature (° C.) | Beta-Gamma Activity | | Beta-Gamma Decontamination Factor | Pu Removed |
|---|---|---|---|---|
| | Initial, mr./hr. | Final, mr./hr. | | |
| 85 | 500 | 35 | 14 | 99.98 |
| 85 | 550 | 34 | 16 | 99.98 |
| 85 | 800 | 34 | 24 | 99.96 |
| 23 | 750 | 5 | 150 | 99.71 |
| 23 | 1,000 | 4 | 250 | 99.46 |
| 23 | 900 | 3 | 300 | 99.47 |

It may be seen from Table I that the beta-gamma activity was reduced by factors from 14 to 24 at 85° C. and by factors from 150 to 300 at 23° C. The plutonium removed was in all cases over 97 per cent. The three samples treated at 85° C. were further treated to remove absorbed radioactivity by immersion in an aqueous solution containing 10% sodium hydroxide, 2.5% sodium tartrate and 2.5% hydrogen peroxide. After water rinsing the samples all showed overall beta-gamma decontamination factors of over 200.

EXAMPLE II

Two sections of a type 347 stainless steel loop which had been subjected to prolonged irradiation in a nuclear reactor while containing a solution of uranyl sulfate and fission products were treated with a 0.4 M chromous sulfate-0.5 M sulfuric acid solution under an atmosphere of carbon dioxide. Another section which had been in contact with a uranyl sulfate-fission product solution, but which has not been subjected to reactor irradiation was treated with the same decontaminating solution. The oxide film was completely removed in all cases. The section not irradiated in a reactor was further contacted with a 10% sodium hydroxide-2.5% sodium tartrate-2.5% hydrogen peroxide solution to remove absorbed radioactive substances, principally ruthenium 103, from the cleaned metal surface. The results obtained may be seen from Table II.

*Table II*

DECONTAMINATION OF IN-PILE LOOP SECTIONS UNDER STATIC CONDITIONS

| Section | Decontaminating Solution | Activity of Pipe (r./hr.) | | Decontamination Factor |
|---|---|---|---|---|
| | | Initial | Final | |
| In neutron flux | 0.4 M $CrSO_4$–0.5 M $H_2SO_4$ at 85° C. for 2 hr. | 25 | [1] 1.2 | 21 |
| Do | do | 26 | [1] 0.9 | 29 |
| Not in neutron flux (a). | do | 30 | [2] 0.21 | 143 } 5×10³ |
| | (b) Alkaline-tartrate-peroxide for 4 hr. at 30° C. | 0.21 | 0.006 | 35 |

[1] Principally $Fe^{59}$ and $Cr^{51}$.
[2] 99% $Ru^{103}$.

While decontamination factors of only 21 and 29 were obtained with the irradiated sections, the remaining radioactive material was $Fe^{59}$ and $Cr^{51}$ formed by activation of iron and chromium in the stainless steel and not amenable to removal.

EXAMPLE III

The ability of a chromous sulfate-sulfuric acid solution to remove and dissolve oxide flakes was shown in the following manner. Four stainless steel loop systems through which a uranyl sulfate solution had been circulated for 22,000 hours at 200° C. to 300° C. were completely descaled in four hours by circulating a 0.4 M chromous sulfate-0.5 M sulfuric acid solution through the systems at 85° C. under an atmosphere of helium. Initially the corrosion film was so thick that during the thermal cycling tests for which the system had been used large flakes of corrosion products had frequently entered the circulating stream and clogged by-pass lines. At the end of the decontamination the interior of the system was free of all clinging oxide, and the metal surface was bright and shiny, with no evidence of pitting or intergranular corrosion. The corrosion products had dissolved during the descaling operation.

EXAMPLE IV

Sample pins of various metals were inserted in a loop circulating a 0.32 M chromous sulfate-0.65 M sulfuric acid solution at 85° C. for 4.4 hours under a helium atmosphere. The metals were corroded as indicated in Table III.

*Table III*

CORROSION OF METALS IN A CHROMOUS SULFATE-SULFURIC ACID SOLUTION

| Material | Depth of Penetration (mils) | Corrosion Rate (mils/year) |
|---|---|---|
| Stainless Steels: | | |
| 347 | 0.13 | 250 |
| 321 | 0.06 | 120 |
| 318 | 0.02 | 31 |
| 316 | 0.02 | 46 |
| 304L | 0.16 | 320 |
| Stellites: | | |
| 98M2 | 0.01 | 23 |
| 6 | 0.04 | 77 |
| 1 | 0.04 | 69 |
| Ti RC-55 | 0.03 | 56 |
| Zr Crystal bar | 0.01 | 14 |

It may be seen from Table III that although the corrosion rate was appreciable for some of the metals, the actual penetration for the four hours' contact time which would be required to remove an oxide scale was slight.

My invention may thus be applied to any metals having corrosion resistances in the same range as the metals listed in Table III.

The above examples are illustrative only and should not be construed as limiting the scope of my invention. Only such limitations should be imposed on the scope of my invention as are indicated in the appended claims.

Having thus described my invention, I claim:

1. A process for removing oxides from the surface of stainless steel which comprises contacting the metal in an atmosphere inert to chromous sulfate with a dilute aqueous sulfuric acid solution containing chromous sulfate.

2. A process for removing oxides and radioactive contaminants from the surface of stainless steel which comprises contacting the metal in an atmosphere inert to chromous sulfate with an aqueous solution containing chromous sulfate in the range of 0.1 M to 1.0 M and sulfuric acid in the range of 0.1 M to 1.5 M at a temperature of from 20 to 90° C.

3. A process for removing oxides and radioactive contaminants from the surface of stainless steel which comprises contacting the metal in an atmosphere inert to chromous sulfate with an aqueous solution containing chromous sulfate in the range of 0.1 M to 1.0 M and sulfuric acid in the range of 0.1 M to 1.5 M at a temperature of from 20 to 90° C. for at least approximately two hours.

4. The process of claim 2 in which the sulfuric acid concentration is from 0.2 M to 1.0 M.

5. The process of claim 4 in which the temperature is from 70 to 90° C.

6. A process for removing oxides from the surface of corrosion-resistant metal surfaces which comprises contacting the metal surface in an atmosphere inert to chromous sulfate with a dilute aqueous sulfuric acid solution containing chromous sulfate.

References Cited in the file of this patent
UNITED STATES PATENTS

| | | |
|---|---|---|
| 1,545,498 | Klinger | July 14, 1925 |
| 2,172,041 | Urban | Sept. 5, 1939 |
| 2,199,418 | Redmond | May 7, 1940 |
| 2,450,861 | Robinson | Oct. 5, 1948 |